United States Patent [19]

Sasaki et al.

[11] Patent Number: 5,080,298
[45] Date of Patent: Jan. 14, 1992

[54] TENSION REDUCER

[75] Inventors: Hironori Sasaki; Yoshihiro Oka, both of Aichi, Japan

[73] Assignee: Kabushiki Kaisha Tokai-Rika-Denki-Seisakusho, Aichi, Japan

[21] Appl. No.: 581,784

[22] Filed: Sep. 13, 1990

[30] Foreign Application Priority Data

Sep. 19, 1989 [JP] Japan .............................. 1-109574[U]

[51] Int. Cl.⁵ .............................................. B60R 22/44
[52] U.S. Cl. ...................................... 242/107; 280/807
[58] Field of Search ............................ 242/107, 107.3; 188/336; 280/806, 807

[56] References Cited

U.S. PATENT DOCUMENTS 3,587,474  6/1971  Fuchs ................................ 242/107.3
3,630,332  12/1971  Price .................................... 188/336
4,162,772  7/1979  Shimogawa et al. .............. 242/107
4,711,408  12/1987  Mori ................................... 242/107

FOREIGN PATENT DOCUMENTS 62-11526  7/1987  Japan .

Primary Examiner—Daniel P. Stodola
Assistant Examiner—John Q. Nguyen
Attorney, Agent, or Firm—Sixbey, Friedman, Leedom & Ferguson

[57] ABSTRACT

A tension reducer for use in a webbing retractor having a webbing take-up spindle for winding a webbing thereon having two types of flat spiral springs, one with strong and the other with weak resilient characteristics connected in series to each other through a gear wheel is urged in a webbing winding direction. The gear wheel is locked to avoid the urging force of the strong flat spiral spring on an occupant. The tension reducer comprises inertial mass bodies movable when the gear wheel is unlocked and a C-shaped friction spring whose diameter is enlarged by the movement of the inertial mass bodies for avoiding an abrupt rotation of the gear wheel relative to the take-up spindle. Thus, the abrupt tension of the strong flat spiral spring is prevented so that the occurrence of an improper sound is reduced.

15 Claims, 3 Drawing Sheets

TENSION REDUCER

BACKGROUND OF THE INVENTION

1.) Field of the Invention:

The present invention relates to a tension reducer, and particularly to a tension reducer suitable for use in a webbing retractor.

2.) Description of the Related Art:

Webbing retractors are known where a webbing fastened to an occupant is wound up on a webbing take-up spindle by an urging force of a flat spiral spring. Such retractors are provided with tension reducers of a type wherein a tensile force exerted on the webbing is reduced by decreasing the urging force of the flat spiral spring in a state where the webbing is fastened to the occupant in such a manner as to avoid the feeling of applied pressure to whoever wears the webbing.

This type of tension reducer (webbing retractors) may be divided into two types: one having a strong resilient characteristic and the other having a weak resilient characteristic (large and small), depending on the above-described flat spiral springs. One of the two types reduces the tensile force exerted on the webbing by making the urging force exerted on the take-up spindle in a state in which the webbing is fastened to the occupant inactive. This type of tension reducer will now be described in detail.

One end of a weak flat spiral spring is connected to the take-up spindle, while the other end thereof is connected to one end of a strong flat spiral spring via a gear wheel with ratchet teeth formed around the outer periphery thereof. The other end of the strong flat spiral spring is fastened to a case (cover). Namely, the take-up spindle, the weak flat spiral spring, the gear wheel and the strong flat spiral spring are connected in series to one another. The take-up spindle is urged toward a webbing winding direction by these flat spiral springs. In addition, a pawl lever is provided in the vicinity of the gear wheel and can be brought into engagement with the ratchet teeth of the gear wheel to block its rotation. The operation of the pawl lever is interlocked with the activation of a solenoid or the opening/closing of vehicle doors.

After unfastening the webbing from around the occupant, the pawl lever is operated by the above-described operating mechanism so that the rotation of the gear wheel is blocked. As a consequence, the urging force produced by the strong flat spiral spring in the webbing winding direction is not exerted on the take-up spindle, and the webbing is subjected to a state in which the tensile force is applied thereto only by the weak flat spiral spring. Thus, the occupant feels unrestricted by the pressure of the webbing. On the other hand, when the occupant releases the webbing fastened thereto, the pawl lever is operated so that the blocking of the gear wheel is released so as to rotate. Therefore, the urging force produced by the strong flat spiral spring in the webbing winding direction is exerted on the take-up spindle through the gear wheel and hence the webbing is immediately wound up thereon.

In a webbing retractor equipped with such a tension reducer, when the tension reducer is released, i.e., when the pawl lever is operated so that the gear wheel is released from the state of its rotation being blocked, the strong flat spiral spring is abruptly rendered tense so that an unpleasant, dull thud sound is produced.

In order to reduce such a sound developed when a tension reducer is deactivated, a tension reducer (and a webbing retractor) provided with a substantially C-shaped friction spring and an inertial mass body disposed inside the friction spring and moved by centrifugal force has been known.

In this type of tension reducer, a ring-shaped fixed wall (which is fixed securely to a frame supporting the take-up spindle) is formed in association with the outer peripheral wall of the friction spring, and the friction spring having a diameter enlarged by the movement of the inertial mass body by centrifugal force is to be brought into contact with the fixed wall. More specifically, when the tension reducer is deactivated to place the pawl lever at intervals from the gear wheel and the gear wheel starts to rotate by the urging force of the strong flat spiral spring, the inertial mass body is moved by the centrifugal force as the gear wheel is rotated, so as to press the friction spring outwardly toward the radial direction (toward the direction of the diameter to be enlarged). As a consequence, the friction spring is forcibly brought into contact with the fixed wall so that frictional force is produced. This frictional force acts as a braking force relative to the rotation of the gear wheel, that is, the urging force of the strong flat spiral spring, so that the abrupt tension of the strong flat spiral spring is reduced, thus reducing the unpleasant sound.

However, the tension reducer having an inertial mass body and a friction spring and capable of reducing the improper sound developed when released is accompanied by the drawback in that when the urging force of the friction spring is set so as to be small as in a case where the braking force is produced by a slight rotation (low centrifugal force) of the gear wheel, the inertial mass body is moved as the gear wheel is rotated in accordance with the rotation of the take-up spindle, so that the unnecessary braking force is produced, thus deteriorating the feeling of pulling out the webbing and its controllability, even at a time other than that of the deactivation of the tension reducer, i.e., at the time of the normal pulling out of the webbing or at the time of winding up of the webbing. In other words, in order to obtain the feeling of the pulling out of the webbing and its controllability as satisfactory, the braking force for reducing the unpleasant sound cannot be increased and the degree of freedom for setting in the braking force is also reduced.

SUMMARY OF THE INVENTION

With the foregoing in view, it is an object of the present invention to provide a tension reducer which is capable of reducing an unpleasant sound developed when the tension reducer is deactivated, ensuring the feeling of the pulling out of a webbing and its controllability as satisfactory regardless of being in an activated state or a deactivated state of the tension reducer, and increasing the degree of freedom for setting in the braking force.

According to one aspect of this invention, there is provided a tension reducer suitable for use in a webbing retractor having a webbing take-up spindle for winding thereon a webbing fastened around an occupant in a vehicle, which comprises:

a first flat spiral spring for urging the take-up spindle in a webbing winding direction;

a connecting member connected to the first flat spiral spring and capable of being rotated relative to the take-up spindle coaxially therewith;

a second flat spiral spring connected to the connecting member and for urging the take-up spindle in the webbing winding direction via the connecting member and the first flat spiral spring;

a receiving portion mounted on the take-up spindle to be rotated integrally with the take-up spindle;

resistance-applying means supported on the connecting member and operated to be brought into contact with the receiving portion when the connecting member is rotated; and rotation prevention means operated to be brought into engagement with the connecting member upon fastening the webbing around the occupant for blocking the connecting member from being rotated in the webbing winding direction, and operated to be brought into disengagement with the connecting member upon unfastening the webbing from around the occupant for thereby permitting the rotation of the connecting member in the webbing winding direction.

In the tension reducer constructed as described above, when the occupant pulls out and secures the webbing against the urging forces of the first and second flat spiral springs in the webbing winding direction, the connecting member is brought into engagement with the rotation prevention means so as to block the rotation of the connecting member in the webbing winding direction. As a consequence, the urging force of the second flat spiral spring in the webbing winding direction does not act on the take-up spindle and the webbing is made tense by only the first flat spiral spring. Accordingly, the occupant feels unrestricted by the pressure of the webbing.

Under activation of this tension reducer, the receiving portion is rotated together with the webbing take-up spindle upon the winding of the webbing thereon. However, the connecting member has been subjected to a stopped state, so that the resistance-applying means is deactivated. Thus, the receiving portion can be freely rotated and the webbing take-up spindle connected to the receiving portion is also rotatable freely and hence the rotation of the webbing take-up spindle for winding the webbing thereon is not blocked. On the other hand, when the connecting member is rotated together with the receiving portion upon pulling out of the webbing from the take-up spindle, the resistance-applying means is activated as the connecting member is rotated so as to be brought into contact with the receiving portion. However, in this state, the connecting member is connected to the receiving portion via the first flat spiral spring so as to rotate together with the webbing take-up spindle and the receiving portion. Therefore, the braking force relative to the rotation of the connecting member, i.e., the urging force of the second flat spiral spring is not produced even when the resistance-applying means is brought into contact with the receiving portion. Accordingly, the feeling of the pulling out the webbing and its controllability do not deteriorate. If the connecting member is not rotated upon pulling out the webbing, the resistance-applying means is deactivated in the same manner as upon winding of the webbing. In addition, the receiving portion is freely rotatable and the webbing take-up spindle connected to the receiving portion can also be rotated freely. Thus, the pulling out of the webbing and its controllability are no longer blocked.

When the occupant unfastens the webbing and the tension reducer is deactivated in response to this operation, the connecting member is released from a state in which its rotation is blocked by the rotation prevention means. As a consequence, the urging force of the second flat spiral spring in the webbing winding direction is exerted on the take-up spindle, so that the webbing is immediately wound up thereon by the first and second flat spiral springs.

Now, upon release of the connecting member from the state where its rotation is blocked, i.e., upon deactivation of the tension reducer, when the connecting member starts rotating by the urging force of the second flat spiral spring, the resistance-applying means is operated as the connecting member is rotated. Namely, the resistance-applying means is brought into contact with the receiving portion. At this time, the receiving portion is connected to the connecting member by the first flat spiral spring, so the urging force of the second flat spiral spring does not act thereon and hence the receiving portion remains unrotated. Thus, the resistance-applying means thus contacting therewith is moved relative to the receiving portion so that frictional force is produced. The frictional force acts as the braking force relative to the rotation of the connecting member, i.e., the urging force of the second flat spiral spring, so that abrupt tension of the second flat spiral spring is reduced, thus reducing unpleasant sounds.

Under the state of deactivation of the tension reducer, the receiving portion and the connecting member are rotated together with the webbing take-up spindle by pulling out the webbing therefrom or winding the same thereon. In addition, the resistance-applying means is brought into contact with the receiving portion as the connecting member is rotated. However, in this state, the connecting member is connected to the webbing take-up spindle through the first flat spiral spring and rotated together with the webbing take-up spindle, the braking force relative to the rotation of the connecting member, that is, the urging force of the second flat spiral spring is not produced even when the resistance-applying means is brought into contact with the receiving portion. Accordingly, the feeling of pulling out the webbing and its controllability do not deteriorate even in a case where the braking force is set so as to be produced by a slight rotation (low centrifugal force) of the connecting member.

As described above, since the frictional force is produced by the resistance-applying means only when the tension reducer is deactivated, and acts as the braking force relative to the rotation of the connecting member, i.e., the urging force of the second flat spiral spring, the abrupt tension of the second flat spiral spring is reduced so that an unpleasant sound is reduced. In addition, feeling of the pulling out of the webbing and its controllability can be ensured as satisfactory regardless of the tension reducer being in an activated state or a deactivated state. In addition, the degree of freedom of setting in the braking force also becomes greater.

According to one mode of this invention, the resistance-applying means comprises inertial mass bodies each of which is movably disposed in a direction in which they are spaced apart from the axis of rotation of the connecting member upon rotation of the connecting member and a friction member provided outwardly of the inertial mass bodies and deformed by the movement of the inertial mass bodies to be brought into contact with the receiving portion.

Accordingly, when the connecting member is rotated, the inertial mass bodies are moved to deform the friction member so as to be brought into contact with the receiving portion, so that resistance is applied to the abrupt relative rotation of the connecting member with respect to the receiving portion. As a result, the abrupt tension of the second flat spiral spring is reduced.

In addition, according to one mode of this invention, a C-shaped friction spring is used as the friction member.

As has been described above, the tension reducer according to the present invention can bring about advantages in that an unpleasant sound developed upon deactivation of the tension reducer can be reduced and the feeling of pulling out of the webbing and its controllability can be ensured as satisfactory in spite of the tension reducer being in an activated state or a deactivated state. In addition, the degree of freedom of setting in the braking force can also be increased.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
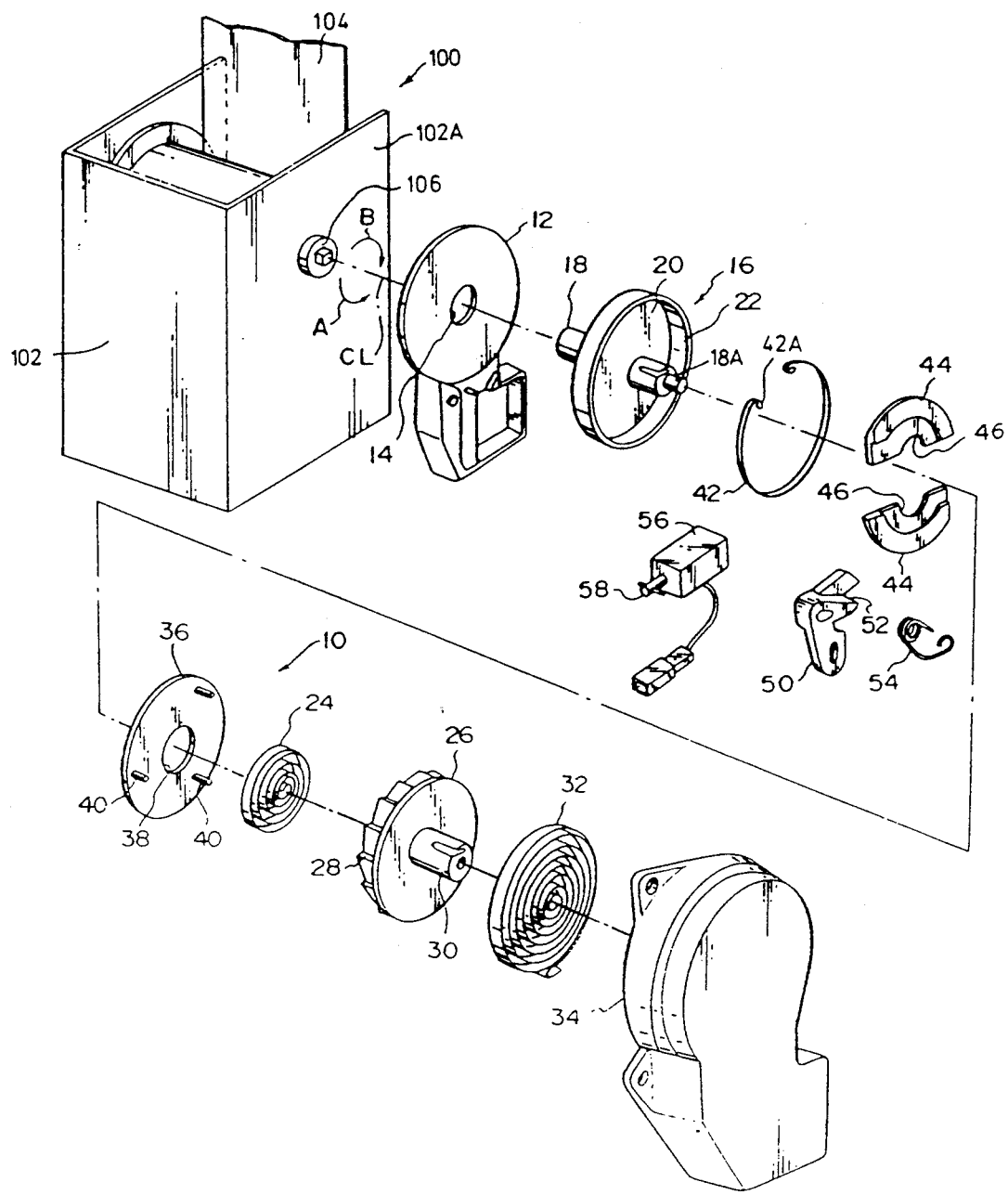
FIG. 1 is an exploded perspective view of a tension reducer according to one embodiment of this invention.

A tension reducer according to a preferred embodiment of this invention will be described with reference to the accompanying drawings. FIG. 1 is an exploded perspective view of a tension reducer 10 according to one embodiment of this invention.

The tension reducer 10 is mounted on a webbing retractor 100. The webbing retractor 100 is provided with a frame 102 fixed to a vehicle body, i.e., a stationary base (not shown). A webbing take-up spindle 106 is rotatably supported to the frame 102 and used to take up a webbing 104 fastened to an occupant. The frame 102 is defined in an inverted U shape with leg plates 102A arranged in an opposing relationship to each other. The take-up spindle 106 is supported to the frame 102 in a state in which both end portions thereof extend outwardly from the leg plates 102A.

A spring sheet 12 of the tension reducer 10 is fixed to the outer surface of one of the leg plates 102A of the frame 102. The spring sheet 12 has a through-hole 14 through which one of the end portions of the take-up spindle 106 (axis CL) extends. A receiving member 16 is supported to one of the end portions thereof.

The receiving member 16 is comprised of a shaft portion 18 coaxially fixed to one end portion of the take-up spindle 106 and an adapter portion 20 integrally formed in a disc form at an intermediate point of the shaft portion 18 in the axial direction thereof. For this purpose, the receiving member 16 is rotated together with the take-up spindle 106 at al times about the shaft portion 18. The receiving member 20 has on the outer peripheral edge thereof a ring-shaped wall portion 22 serving as an engagement portion which extends out in the direction opposite to the spring sheet 12 along the axis CL.

On the other hand, the inner end portion of a weak flat spiral spring 24 is maintained in engagement with the end portion of the shaft portion 18, which is located at the side opposite to the spring sheet 12, and the outer end portion of the weak flat spiral spring 24 is maintained in engagement with a gear wheel 26 as a connecting member. The gear wheel 26 is defined in a disc form with a plurality of ratchet teeth 28 provided on the outer periphery thereof and has its central portion supported on a small diameter portion 18A corresponding to the end portion of the shaft portion 18, which is located at the side opposite to the spring sheet 12. In addition, at the central portion of the gear wheel 26, a shaft portion 30 extends out along the axis CL at the side opposite to the receiving member 16. The inner end portion of a strong flat spiral spring 32 is maintained in engagement with the shaft portion 30. The outer end portion of the strong flat spiral spring 32 interlocks with a cover 34 secured to the leg plate 102A of the frame 102. Namely, the receiving member 16, the weak flat spiral spring 24, the gear wheel 26 and the strong flat spiral spring 32 are connected in series to one another. The receiving member 16 and the webbing take-up spindle 106 connected thereto are urged in a webbing take-up direction (direction indicated by the arrow B in FIG. 1) by means of the weak flat spiral spring 32 and the strong flat spiral spring 34.

An inner cover 36 is provided between the adapter portion 20 of the receiving member 16 and the weak flat spiral spring 24. The inner cover 36 is in the form of a disc and has at its central portion a through-hole 38 for the insertion of the shaft portion 18 of the receiving member 16. A plurality of connecting pins 40 are formed from around the peripheral portion of the through-hole 38 and project toward the gear wheel 26 so as to engage holes (not shown) defined in the gear wheel 26 thereby integrally connecting the inner cover 36 and the gear wheel 26 to each other. Thus, the present embodiment is constructed such that the weak flat spiral spring 24 is disposed between the inner cover 36 and the gear wheel 26, and the inner cover 36 is always rotated together with the gear wheel 26.

A means for applying resistance to the abrupt relative rotation of the gear wheel 26 with respect to the receiving member 16 is provided between the inner cover 36 and the receiving member 16. The resistance-applying means comprises a substantially C-shaped friction spring 42 as a frictional member provided on the inner side of the wall portion 22 of the receiving member 16 and a pair of control plates 44 as inertial mass bodies which are provided inside the friction spring 42 and are moved by centrifugal force to thereby cause the diameter of the friction spring 42 to enlarge.

The friction spring 42 has a diameter slightly smaller than the inner diameter of the wall portion 22 of the receiving member 16 and has both end portions having portions 42A bent toward the inside. Thus, the friction spring 42 is normally placed at intervals from the inner peripheral wall of the wall portion 22. However, it can be brought into contact with the inner peripheral wall of the wall portion 22 by enlarging the diameter of the friction spring 42. Each of the control plates 44 provided inside the friction spring 42 is substantially formed in the shape of a semicircle so as to extend along the bent inner wall of the friction spring 42. Each control plate 44 also has semicircle cut-away portions 46 each of which is defined in a portion corresponding to the shaft portion 18 of the receiving member 16. One of the control plates 44 has a ridge 44A (see FIG. 2), which projects in the radial direction, at an edge located at the side opposite to the cut-away portion 46. Provided on the surface of the inner cover 36, which is in an opposing relationship with the receiving member 16, is convex portions 48 (shown in FIGS. 2 and 3) each of which is operated to press the control plate 44 upon rotation of the gear wheel 26, i.e., the inner cover 36 to exert centrifugal force thereon so that the control plate 44 is moved outwardly in the radial direction from the center of rotation thereof. The convex portions 48 are provided in a pair corresponding to the pair of control plates 44. The convex plates 48 are defined in a substantially T-shape and are fixed so as to be symmetrical with each other with respect to the shaft portion 18 of the receiving member 16.

Figure 2:
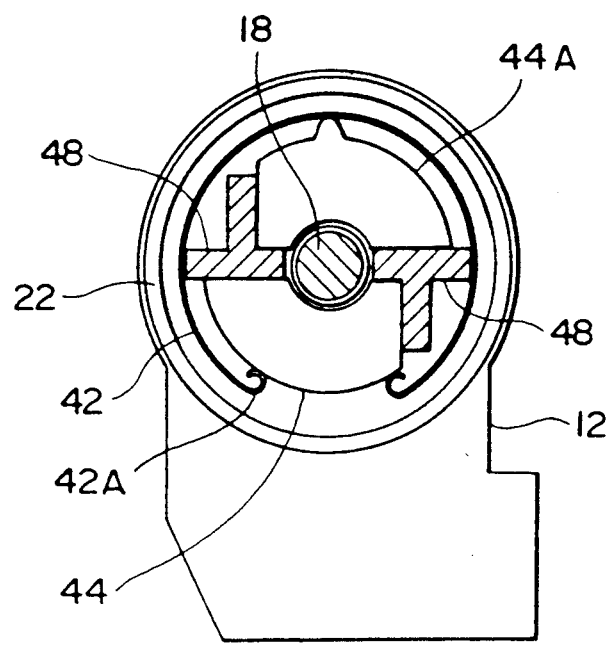
FIGS. 2 and 3 are diagrams in operation showing a state of the tension reducers and friction springs being activated.

The respective members and portions of the resistance-applying means constructed in the above-described manner are arranged so as to be in a state illustrated in FIG. 2. More specifically, the pair of control plates 44 are disposed inside the friction spring 42 and press the convex portions 48 by means of the urging force of the friction spring 42 via the ridge 44A and the bent portions 42A. In the state illustrated in FIG. 2, the control plates 44 are not brought into contact with the shaft portion 18 owing to the presence of the cut-away portion 46 and deactivated so as to apply the resistance to the rotation of the receiving member 16 upon rotation of the receiving member 16 relative to the gear wheel 26. When the inner cover 36, i.e., the gear wheel 26 is rotated from this state, the control plates 44 are pressed with the convex portion 48 to be rotated together with the inner cover 36 so as to be moved outwards from the center of rotation by centrifugal force. As a result, the friction spring 42 is enlarged so that the outer peripheral wall thereof is pressed against the wall portion 22 of the receiving member 16.

A pawl lever 50 (FIG. 1) constituting a rotation prevention means is swingably disposed below the gear wheel 26. The pawl lever 50 has a hook 52 defined therein, which is engageable with the ratchet teeth 28 of the gear wheel 26. When the hook 52 engages the ratchet teeth 28, the rotation of the gear wheel 26 in the webbing take-up direction (direction indicated by the arrow B in FIG. 1) is blocked.

A return spring 54 is provided in the vicinity of the pawl lever 50 and always urges the hook 52 of the pawl lever 50 toward the direction to be separated from the ratchet teeth 28. A solenoid 56 constituting a rotation prevention means in the same manner as the pawl lever 50 is provided adjacent to the pawl lever 50. An actuator portion 58 of the solenoid 56 is connected to the pawl lever 50 and swingably rotates the pawl lever 50 against the urging force of the return spring 54 when in operation so as to permit engagement of the hook 52 with the ratchet teeth 28. Incidentally, the solenoid 56 is actuated when the occupant fastens the webbing whereas it stops its actuation at the time the occupant unfastens the webbing. For example, as an operating mechanism for this solenoid 56, a buckle switch may be used so that when the vehicle occupant engages the tongue plate with the buckle, the solenoid 56 is energized to operate. Similarly, when the tongue plate is disengaged from the buckle, energization is stopped.

A description will now be made of operation of the present embodiment.

In the above-described tension reducer 10, when the occupant draws out and fastens a webbing 104 against the urging force produced by the weak flat spiral spring 24 and the strong flat spiral spring 32 in the webbing take-up direction (direction indicated by the arrow B in FIG. 1), the solenoid 56 is energized. When the solenoid 56 is energized, the pawl lever 50 swings owing to movement of the actuator portion 58 to bring the hook 52 into engagement with the ratchet teeth 28 of the gear wheel 26 so as to block the rotation of the gear wheel 26 in the webbing take-up direction (direction indicated by the arrow B in FIG. 1). As a consequence, the urging force produced by the strong flat spiral spring 32 in the webbing take-up direction does not act on the webbing take-up spindle 106 connected to the receiving member 16, so that the webbing 104 is pulled by only the weak flat spiral spring 24. Accordingly, the occupant is secured by the webbing without being subjected to the feeling of pressure.

Figure 3:
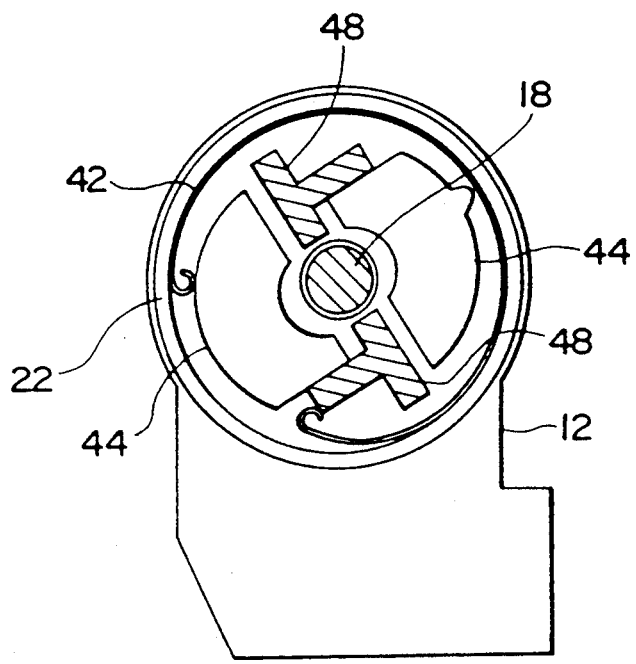

Under the state of the tension reducer being energized, the receiving member 16 is rotated together with the webbing take-up spindle 106 upon pulling-out of the webbing 104. However, the gear wheel 26 is brought into a state in which it is blocked from being rotated. Thus, the inner cover 36 and the paired control plates 44 are also stopped in the same manner as referred to above. Namely, as shown in FIG. 2, the control plates 44 are pressed toward the inner side of the friction spring 42 by the urging force of the friction spring 42 to be brought into contact with the convex portions 48 of the inner cover 36 but not to be brought into contact with the shaft portion 18 of the receiving member 16. The friction spring 42 itself is also brought into a state in which it is separated from the wall portion 22 of the receiving member 16. Thus, the receiving member 16 can freely be rotated without being subjected to the resistive force, and the webbing take-up spindle 106 connected to the receiving member 16 is also rotated smoothly in the webbing take-up direction. On the other hand, since the gear wheel 26 can be rotated in a webbing draw out direction (direction indicated by the arrow A in FIG. 1) upon pulling-out the webbing 104, the gear wheel 26 and the inner cover 36 are rotated together with the receiving member 16. When the inner cover 36 is rotated, the control plates 44 are pressed by the convex portion 48 in response to the rotation of the inner cover 36 to be rotated, so that they are moved outwards in the radial direction of the receiving member 16 by centrifugal force. As a consequence, the control plates 44 press the friction spring 42 to enlarge the diameter thereof so that it is forcibly brought into contact with the wall portion 22 of the receiving member 16 as shown in FIG. 3. However, in the state referred to above, the receiving member 16 is rotated together with the gear wheel 26, the inner cover 36, the control plates 44 and the friction spring 42. Therefore, the braking force relative to the rotation of the receiving member 16, i.e., the force for pulling out the webbing 104 (in other words, the rotation of the gear wheel 26 or the urging force of the strong flat spiral spring 32) is not produced even when the friction spring 42 is brought into contact with the wall portion 22. Accordingly, it is obvious that the feeling of the pulling out of the webbing and its controllability do not deteriorate.

When the occupant unfastens the webbing 104 and the solenoid 56 is turned off (deenergized) in response to this operation, the pawl lever 50 is caused to swing by the urging force of the return spring 54 so that the hook 52 is separated from the ratchet teeth 28, to thereby release the blocked state of rotation of the gear wheel 26. As a consequence, the urging force produced by the strong flat spiral spring 32 in the webbing winding direction (direction indicated by the arrow B in FIG. 1) acts upon the webbing take-up spindle 106 through the gear wheel 26, the weak flat spiral spring 24 and the receiving member 16, so that the webbing 104 is taken up immediately by the urging force of the strong flat spiral spring 32.

Now, upon release of the gear wheel 26 from its rotation blocked state, i.e., upon deactivation of the tension reducer, when the gear wheel 26 and the inner cover 36 start to rotate by the urging force of the strong flat spiral spring 32, the control plates 44 are pressed with the convex portions 48 as the inner cover 36 is rotated, so that they are moved outwards in the radial direction of the receiving member 16 by centrifugal force. As a consequence, the friction spring 42 is pressed to enlarge the diameter thereof so as to be forcibly brought into contact with the wall portion 22 of the receiving member 16 (the state illustrated in FIG. 3). At this time, the receiving member 16 is connected to the gear wheel 26 by only the weak flat spiral spring 24, so the urging force of the strong flat spiral spring 32 still does not act thereon. Thus, the friction spring 42 forcibly brought into contact with the wall portion 22 is moved relative to the wall portion 22 of the receiving member 16 so that frictional force is produced. The frictional force acts as a braking force relative to the rotation of the gear wheel 26, i.e., the urging force of the strong flat spiral spring 32, so that abrupt tension of the strong flat spiral spring 32 is made less, thus reducing unpleasant sounds.

Under the state of deactivation of the tension reducer, the receiving member 16, the gear wheel 26 and the inner cover 36 are rotated together with the webbing take-up spindle 106 by pulling out the webbing 104 therefrom or winding the same thereon. In addition, the control plates 44 are moved by centrifugal force as the inner cover 36 is rotated, and press the friction spring 42 to enlarge the diameter thereof, so that the friction spring 42 is forcibly brought into contact with the wall portion 22 of the receiving member 16 (the state illustrated in FIG. 3). However, in this state, the receiving member 16 is rotated together with the gear wheel 26, the inner cover 36, the control plates 44 and the friction spring 42 as described above, so the braking force relative to the rotation of the receiving member 16, that is, the force (in other words, relative to the rotation of the gear wheel 26, i.e., the urging force of the strong flat spiral spring 32) for pulling out the webbing is not developed even when the friction spring 42 is brought into contact with the wall portion 22. Accordingly, the feeling of pulling out of the webbing 104 and its controllability do not deteriorate even in a case where the braking force is set so as to be produced by a slight rotation (low centrifugal force) of the gear wheel 26.

As described above, since the frictional force is produced by the friction spring 42 only when the tension reducer is deactivated, and acts as the braking force relative to the rotation of the gear wheel 26, i.e., the urging force of the strong flat spiral spring 32, the abrupt tension of the strong flat spiral spring 32 is made less so that unusual sounds are reduced. In addition, the feeling of pulling out of the webbing and its controllability can be ensured as satisfactory regardless of whether the activated state of the tension reducer or the deactivated state thereof. Furthermore, the degree of freedom for setting the braking force also becomes greater because the feeling of pulling out the webbing and its controllability are not deteriorated even when the frictional force to be produced by the friction spring 42 is set so as to become larger.

Having now fully described the invention, it will be apparent to those skilled in the art that many changes and modifications can be made without departing from the spirit or scope of the invention as set forth herein.

What is claimed is:

1. A tension reducer suitable for use in a webbing retractor having a webbing take-up spindle for winding thereon a webbing fastened around an occupant in a vehicle, which comprises:
    a first flat spiral spring for urging said take-up spindle in a webbing winding directing;
    a connecting member connected to said first flat spiral spring and capable of being rotated relative to said take-up spindle coaxially therewith;
    a second flat spiral spring connected to said connecting member and for urging said take-up spindle in the webbing winding direction via said connecting member and said first flat spiral spring;
    a receiving portion mounted on said take-up spindle to be rotated integrally with said take-up spindle;
    resistance-applying means supported on said connecting member and operating to be brought into contact with said receiving portion when said connecting member is rotated; and
    rotation prevention means operated to be brought into engagement with said connecting member upon fastening the webbing around the occupant for thereby blocking said connecting member from being rotated in the webbing winding direction, and operated to be brought into disengagement with said connecting member upon unfastening the webbing from around the occupant for permitting the rotation of said connecting member in the webbing winding direction
    wherein, when said webbing is being pulled out of said webbing take-up spindle and being wound to said webbing take-up spindle, said resistance applying means is rotated together with said receiving portion, so that no frictional force occurs therebetween even when said resistance applying means is in contact with said receiving portion, and when said rotation prevention means is brought into disengagement with said connecting member for permitting the rotation of said connecting member in the webbing winding direction, said resistance applying means is brought into contact with said receiving portion by the rotation of said connecting member while said receiving portion still does not act on the rotation of said connecting member so that a frictional force occurs between said resistance applying means and said receiving portion so as to act as a braking force relative to the rotation of said connecting member.

2. A tension reducer according to claim 1, wherein said resistance-applying means is supported to said connecting member and comprises inertial mass bodies each of which is movably disposed in a direction in which they are spaced apart from the axis of rotation of said connecting member upon rotation of said connecting member and a friction member provided outwardly of said inertial mass bodies and deformed by the movement of said inertial mass bodies to be brought into contact with said receiving portion.

3. A tension reducer according to claim 2, wherein said friction member comprises a substantially C-shaped spring member so constructed that said deformation is made by enlarging the diameter of said friction member.

4. A tension reducer according to claim 3, wherein said receiving portion includes a ring-shaped wall portion brought into contact with said spring member by enlarging the diameter of said spring member.

5. A tension reducer according to claim 4, wherein said connecting member includes a press portion for pressing each of said inertial mass bodies so as to move the same upon rotation of said connecting member.

6. A tension reducer according to claim 5, wherein a urging force of said first flat spiral spring is set so as to be smaller than that of said second flat spiral spring.

7. A tension reducer according to claim 6, wherein said receiving portion comprises a disc portion fixed coaxially with said take-up spindle and said ring-shaped wall portion provided on the peripheral edge of said disc portion.

8. A tension reducer according to claim 6, wherein said connecting member has its outer peripheral portion provided with ratchet teeth and said rotation prevention means has a pawl operated to be brought into engagement with said ratchet teeth to thereby block the rotation of said connecting member in the webbing winding direction.

9. A tension reducer suitable for use in a webbing retractor having a webbing take-up spindle for taking up a webbing fastened around an occupant in a vehicle, which comprises:
   a first flat spiral spring for urging said take-up spindle in a webbing winding direction;
   a connecting member connected to said first flat spiral spring and capable of being rotated relative to said take-up spindle coaxially therewith;
   a second flat spiral spring connected to said connecting member for urging said take-up spindle toward the webbing winding direction via said connecting member and said first flat spiral spring, and urging force of said second flat spiral spring being set so as to be larger than that of said first flat spiral spring;
   a receiving portion securely fixed to an end portion of said take-up spindle to be rotated integrally with said take-up spindle;
   inertial mass bodies each of which is supported to said connecting member and movably disposed in a direction in which they are spaced apart from the axis of rotation of said connecting member upon rotation of said connecting member;
   a friction member provided outwardly of said inertial mass bodies and deformed by the movement of said inertial mass bodies to be brought into contact with said receiving portion; and
   rotation prevention means operated to be brought into engagement with said connecting member upon fastening the webbing around the occupant for blocking said connecting member from being rotated in the webbing winding direction, and operated to be brought into disengagement with said connecting member upon unfastening the webbing from around the occupant for permitting the rotation of said connecting member in the webbing winding direction wherein, when said webbing is being pulled out of said webbing take-up spindle and being wound to said webbing take-up spindle, said inertial mass bodies and said friction member are rotated together with said receiving portion, so that frictional force occurs between said friction member and said receiving portion even when said friction member is in contact with said receiving portion, and when said rotation prevention means is brought into disengagement with said connecting member for permitting the rotation of said connecting member in the webbing winding direction, said friction member is brought into contact with said receiving portion by the movement of said inertial mass bodies due to the rotation of said connecting member while said receiving portion still does not act on the rotation of said connecting member, so that a frictional force occurs between said friction member and said receiving portion so as to act as a braking force relative to the rotation of said connecting member.

10. A tension reducer according to claim 9, wherein said friction member comprises a substantially C-shaped friction spring so constructed that said deformation is made by enlarging the diameter of said friction member.

11. A tension reducer according to claim 10, wherein said receiving portion includes a ring-shaped wall portion brought into contact with said friction spring by enlarging the diameter of said friction spring.

12. A tension reducer according to claim 11, wherein said connecting member includes a press portion for pressing each of said inertial mass bodies so as to move the same upon rotation of said connecting member.

13. A tension reducer according to claim 11, wherein said inertial mass bodies are provided in a pair symmetrically with respect to the axis of rotation of said connecting member.

14. A tension reducer according to claim 12, wherein said receiving portion comprises a disc portion fixed coaxially with said take-up spindle and said ring-shaped wall portion provided on the peripheral edge of said disc portion.

15. A tension reducer according to claim 12, wherein said connecting member has its outer peripheral portion provided with ratchet teeth and said rotation prevention means has a pawl operated to be brought into engagement with said ratchet teeth to block the rotation of said connecting member in the webbing winding direction.

* * * * *